(12) United States Patent
Stoettrup et al.

(10) Patent No.: US 9,778,627 B2
(45) Date of Patent: Oct. 3, 2017

(54) METHOD OF CONTROLLING A POWER NETWORK

(71) Applicants: Michael Stoettrup, Herning (DK); Kaj Skov Nielsen, Issaquah, WA (US)

(72) Inventors: Michael Stoettrup, Herning (DK); Kaj Skov Nielsen, Issaquah, WA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 748 days.

(21) Appl. No.: 13/678,896

(22) Filed: Nov. 16, 2012

(65) Prior Publication Data

US 2014/0142779 A1     May 22, 2014

(51) Int. Cl.
*G05B 15/02* (2006.01)
*G05B 11/01* (2006.01)
(Continued)

(52) U.S. Cl.
CPC ............. *G05B 13/02* (2013.01); *G06Q 50/06* (2013.01); *H02J 3/28* (2013.01); *H02J 3/38* (2013.01); *H02J 3/382* (2013.01); *H02J 15/00* (2013.01); *H02J 3/008* (2013.01); *H02J 7/0013* (2013.01); *H02J 2003/146* (2013.01);
(Continued)

(58) Field of Classification Search
CPC ... G05B 13/02; H02J 15/00; H02J 3/38; H02J 3/28; H02J 7/0013; H02J 2003/146; H02J 3/382; Y04S 20/222; Y04S 20/224; Y02B 70/3225; G06Q 50/06

USPC ..... 700/286, 9, 22, 108, 109, 295, 297, 296; 290/44
See application file for complete search history.

(56) References Cited

U.S. PATENT DOCUMENTS 4,802,100 A * 1/1989 Aasen et al. .................. 700/288
6,452,289 B1 * 9/2002 Lansberry et al. ............. 307/25
(Continued)

FOREIGN PATENT DOCUMENTS

CN     1256465 A     6/2000
CN     101084522 A    12/2007

OTHER PUBLICATIONS

Li et al., "Utility-based scheduling for grid computing under constraints of energy budget and deadline", 2009, Elsevier, pp. 1131-1142.*

(Continued)

*Primary Examiner* — Robert Fennema
*Assistant Examiner* — Thomas Stevens (57) ABSTRACT

A method is provided for controlling a power network that includes a plurality of power generation facilities connected to an electricity grid and a plurality of power storage facilities connected to the power generation facilities. The method includes monitoring a production capacity of the power generation facilities, monitoring a storage capacity of the power storage facilities and determining an optimal facility control plan on the basis of the storage capacity and the production capacity. The method further includes operating the power network, according to the facility control plan, to feed power from the power generation facilities into the electricity grid and/or to transfer power from the power generation facilities to the power storage facilities and/or to consume power from the power storage facilities.

13 Claims, 4 Drawing Sheets

(51) Int. Cl.

| | | |
|---|---|---|
| *G06F 19/00* | (2011.01) | |
| *G05F 3/12* | (2006.01) | |
| *G05B 13/02* | (2006.01) | |
| *H02J 3/28* | (2006.01) | |
| *H02J 3/38* | (2006.01) | |
| *H02J 15/00* | (2006.01) | |
| *G06Q 50/06* | (2012.01) | |
| *F03D 9/00* | (2016.01) | |
| *H02J 7/00* | (2006.01) | |
| *H02J 3/14* | (2006.01) | |
| *H02J 3/00* | (2006.01) | |

(52) U.S. Cl.
CPC ........... *Y02B 70/3225* (2013.01); *Y02E 70/30* (2013.01); *Y04S 20/222* (2013.01); *Y04S 20/224* (2013.01); *Y04S 50/10* (2013.01)

(56) References Cited

U.S. PATENT DOCUMENTS

| | | | | |
|---|---|---|---|---|
| 6,512,966 | B2* | 1/2003 | Lof et al. | 700/291 |
| 6,522,955 | B1* | 2/2003 | Colborn | 700/286 |
| 8,775,136 | B2* | 7/2014 | Akrotirianakis et al. | 703/2 |
| 2002/0082747 | A1* | 6/2002 | Kramer | 700/276 |
| 2002/0087234 | A1* | 7/2002 | Lof et al. | 700/291 |
| 2002/0128748 | A1* | 9/2002 | Krakovich et al. | 700/286 |
| 2002/0198629 | A1* | 12/2002 | Ellis | 700/286 |
| 2007/0005192 | A1* | 1/2007 | Schoettle et al. | 700/286 |
| 2008/0217998 | A1* | 9/2008 | Parmley | H02J 1/10 307/65 |
| 2009/0066287 | A1* | 3/2009 | Pollack | G06Q 50/00 320/101 |
| 2010/0138066 | A1* | 6/2010 | Kong | G06Q 30/018 700/295 |
| 2010/0305890 | A1 | 12/2010 | Huang | |
| 2011/0055036 | A1 | 3/2011 | Helfan | |
| 2011/0082598 | A1* | 4/2011 | Boretto | G06Q 10/06 700/291 |
| 2011/0089693 | A1* | 4/2011 | Nasiri | F03D 7/0272 290/44 |
| 2011/0276194 | A1 | 11/2011 | Glenn | |
| 2012/0061963 | A1* | 3/2012 | Thisted | 290/44 |
| 2012/0191262 | A1* | 7/2012 | Marcus | 700/286 |
| 2012/0306204 | A1* | 12/2012 | Garcia | 290/44 |
| 2013/0024042 | A1* | 1/2013 | Asghari et al. | 700/295 |
| 2013/0081394 | A1* | 4/2013 | Perry | 60/641.8 |
| 2013/0245847 | A1* | 9/2013 | Steven et al. | 700/291 |
| 2014/0114489 | A1* | 4/2014 | Duff | 700/291 |
| 2014/0351010 | A1* | 11/2014 | Kong | G05F 1/66 705/7.29 |

OTHER PUBLICATIONS

Fang Xi et al; "Smart Grid—The New and improved Power Grid: A Survey"; IEEE Communications Surveys, New York; vol. 14; No. 4; pp. 944-960; ISSN: 1553-877X; DOI: 10.1109/SURV.2011.101911.00087; XP011471438; 2012; US; Oct. 1, 2012.

Caldon R. et al; "Optimisation Algorithm for a Virtual Power Plant Operation"; Universities Power Engineering Conference, 2004, UPEC 2004, 39th Inernational Bristol, UK Sep. 6-8, 2004, Piscataway, NJ; vol. 3; pp. 1058-1062; ISBN: 976-1-86043-365-8; XP01082515.9; 2004; Sep. 6, 2004.

Lombardi P. et al; "Optimal Operation of a Virtual Power Plant"; Power&Energy Society General Meeting, 2009; PES '09, IEEE, Piscataway, NJ; pp. 1-6; ISBN: 978-1-4244-4241-6; XP031536978; 2009; US; Jul. 26, 2009.

* cited by examiner

METHOD OF CONTROLLING A POWER NETWORK

FIELD OF INVENTION

The invention describes a method of controlling a power network; a power network controller; and a power network

BACKGROUND OF INVENTION

Conventional base load power production plants or facilities—for example nuclear power plants or fossil-fuel power plants—can deliver power as required to an electricity grid. A grid operator may determine the base load at any specific time, i.e. the amount of power required by customers supplied by the grid, and issue appropriate references to any power plant that feeds into the grid. Such power plants are generally characterized by a constant power output. In the case of power production plants that generate electricity using renewable energy sources such as wind energy or solar energy, the amount of power that can be output depends to some extent on the environmental situation, for example the strength of the wind in the case of a wind power plant; or the time of day and extent of cloud cover in the case of a photovoltaic power plant. In certain situations, such a conventional "renewable" power plant may have the potential to produce more power than is actually needed, but since the power plant may only generate as much power as is required to fulfil a grid demand, the additional power that it is capable of producing is effectively wasted since it cannot be fed into the grid. The amount of power generated by a power production facility is regulated or managed by a plant operator, which ensures that the power fed into the grid fulfils the grid requirements at all times. A power plant operator, for example a wind power plant "pilot", is effectively separate and isolated from the grid operator. Therefore, in conventional arrangements, only the grid operator can make use of a power storage facility in which a power "surplus" could be stored for later use. However, the management of power storage facilities in isolation from the power generation plants means that these cannot be operated to optimally utilize their capabilities, and their management is also severely constrained by limitations imposed by grid requirements.

SUMMARY OF INVENTION

It is therefore an object of the invention to provide an improved way of operating a power network that comprises both power production plants and power storage plants.

This object is achieved by the features of the independent claims.

According to the invention, the method of controlling a power network—comprising a number of power generation facilities connected to an electricity grid and a number of power storage facilities connected to the power generation facilities—comprises the steps of monitoring a production capacity of the power generation facilities; monitoring a storage capacity of the power storage facilities; determining an optimal facility control plan on the basis of the storage capacity and the production capacity; and operating the power network, according to the facility control plan, to feed power from the power generation facilities into the electricity grid and/or to transfer power from the power generation facilities to the power storage facilities and/or to consume power from the power storage facilities.

The power storage facilities are connected to the power generation facilities, which is to be understood to mean that energy output by a power generation facility can be transferred in some manner to one or more of the power storage facilities. Energy transfer can take place over the electricity grid, or a power storage facility may be directly fed by a power generation facility, effectively bypassing the electricity grid.

An advantage of the method according to the invention is that any number or combination of power generation facilities and power storage facilities can always be operated in a most optimal manner, preferably in a financially most optimal manner. The power facilities can be operated under a kind of "mutual dependency", i.e. a power facility may be controlled under consideration of its own capabilities and also under consideration of the capabilities of the other power facilities. For example, an optimal facility control plan may determine that some quantity of power should not be fed into the grid by the power generation facilities, but should instead be stored in one or more power storage facilities, while power from other power storage facilities may be retrieved and fed into the grid instead. The decision to generate power, store power or consume a quantity of stored power (e.g. to feed it into the grid) can be influenced by many different factors, as will become clear below.

By determining an optimal facility control plan, the power network can be controlled at any instant in a most optimal manner, from the point of view of energy efficiency as well as economy. Furthermore, any excess power that can be produced by the power generation facilities can be stored for later use in the power storage facilities, while any power deficit of the power generation facilities can be corrected by retrieving power from the power storage facilities. Here, "excess power" is to be understood as any power that is in excess of that required by the electricity grid, while a "power deficit" is to be understood to mean a situation in which the power generation facilities might not be able to meet the grid requirement on their own.

According to the invention, a power network controller for controlling a power network—comprising a number of power generation facilities connected to an electricity grid and a number of power storage facilities connected to the power generation facilities—comprises an optimizing module for determining an optimal facility control plan on the basis of a storage capacity of the power storage facilities and a generation capacity of the power generation facilities; and a reference computation unit for computing references for the power generation facilities and the power storage facilities on the basis of the facility control plan.

An advantage of the power network controller according to the invention is that control of the power storage facilities and control of the power generation facilities can be combined in such a way that the facilities are always used to their optimum capacity. By computing "customized" references—for example voltage references, power factor references, active power references, etc.—for each of the power generation facilities and the power storage facilities, these can always be operated in the most effective manner to ensure that the power network is optimally run from an energy-efficiency point of view as well as from a financial point of view.

According to the invention, a power network comprises a number of power generation facilities connected to an electricity grid and a number of power storage facilities connected to the power generation facilities; and also comprises a power network controller according to the invention for controlling the power network.

An advantage of the power network according to the invention is that it can control any number of power generation facilities and any number of power storage facilities, while the facilities can be of any type or nature. The different or varying production capabilities of power generation facilities can be optimally combined with the different or varying storage capabilities of power storage facilities. Another advantage of the power network according to the invention is that the power generation facilities and the power storage facilities need not be located geographically close to each other, but can be located essentially anywhere. Such an arrangement of distributed power facilities can be referred to collectively as a "virtual" power plant. As indicated above, energy transfer between a power generation facility and a power storage facility can take place over the grid, so that the power network according to the invention can be regarded as a combined virtual plant.

Further embodiments and features are given by the dependent claims, as revealed in the following description. Features of different claim categories may be combined as appropriate to give further embodiments not described herein.

The term "power network" used in the context of the invention is to be understood to comprise both power production facilities and power storage facilities. A "facility" can comprise a single unit or it may comprise a number of units. For example, a power production plant such as a wind power plant can comprise any number of power generating units, in this case wind turbines. Of course, a single wind turbine can also be regarded as a power production plant. Therefore, in the following, but without restricting the invention in any way, the terms "plant" and "facility" may be used interchangeably. A plant or facility is controlled or managed by means of its input references. The "reference" is used in the accepted sense and is to be understood as a control input or setpoint, for example a voltage setpoint, a power factor setpoint, etc. A control input could also be in the form of an activated pre-programmed function comprising digital commands, for example a pre-programmed function to control an inertial response. A controller of a power facility will respond to an input reference by taking appropriate action. For example, a plant controller can send a power reference to a wind turbine controller resulting in a control signal being sent to a pitch drive in order to pitch the rotor blades to obtain a desired increase or decrease in output power. Similarly, an input setpoint to a power storage facility might be linked to the control of a switch, transformer, valve, compressor, etc. in order to convert electricity into a stored energy form.

A renewable energy source such as wind turbine can provide "ancillary services" in addition to its main service or function, namely to provide active power to the grid. An example of an ancillary service of a wind turbine may be its ability to provide spinning reserve. Similarly, some energy storage devices can also provide ancillary services in addition to their storage capabilities. Therefore, in a particularly preferred embodiment of the invention, the method of controlling a power network preferably also comprises the step of monitoring any ancillary service capability of a production facility and any ancillary service capability of a storage facility. This information is then also preferably considered in the step of determining the optimal facility control plan with a view to optimising the revenue capability of the power network, considering the value of the actual energy delivered to the grid, the value of the combination of ancillary services delivered to the grid, and the operating cost of delivering each of those services. The step of determining the optimal facility plan therefore can involve making decisions about which ancillary service of a production facility and/or a storage facility should be supplied, depending on what is most cost effective. For example, stored energy from a storage facility may be delivered as base load energy to the grid or as an ancillary service, or as a combination of base load and ancillary service, depending on which is most "attractive" from the operational point of view.

The power network controller according to the invention can directly manage a power production unit by communicating, i.e. exchanging appropriate signals, with a controller of the power production unit. A power plant comprising a plurality of power generating units is generally controlled by a central control system, for example a "park pilot" in the case of a wind power plant. In this case, the power network controller according to the invention preferably communicates with the park pilot or can be realised as an integral part of the park pilot.

A power storage facility of the power network according to the invention can be "reversible" or "non-reversible". A reversible power storage facility can output energy in the same form as it was input into the storage facility. An example of a reversible power storage facility might be a battery, which can be charged using an electrical current, and which outputs an electrical current when discharged. For example, a battery storage facility can comprise a rechargeable vehicle battery, and "surplus" electrical energy produced by the power production facilities can be used to charge such batteries. In one embodiment, a power storage facility preferably comprises batteries of a fleet of electric service vehicles. Another example of a reversible power storage facility might be a hydro-electric facility, for which electrical energy is used to pump water into a reservoir, and which outputs electricity again when the stored water is used to drive a turbine. A non-reversible power storage facility outputs its stored energy in a different form. An example of a non-reversible power storage facility might be a synthetic natural gas facility, for which electrical energy is used to synthesize gas and to supply this directly to consumers without any further conversion. Equally, a synthetic natural gas facility might be operated as a reversible facility by including a gas turbine for converting the stored gas into electric power that can be fed into the electricity grid. Other examples of power storage facilities are a thermal storage facility; a flywheel storage facility; a compressed air storage facility; or any other type of power storage facility that is capable of converting electrical energy and storing it in a form from which it can later be retrieved.

In a power network according to the invention, a power generation facility can comprise any of the group of power generation facilities comprising a wind power plant; a tidal power plant; a solar power plant, or any other type of power production facility that is capable of producing energy that can be fed into an electricity grid and/or converted for storage in a power storage plant.

The method according to the invention preferably comprises a step of determining a grid requirement to be fulfilled by the power network, since the power that is fed into an electrical grid must usually satisfy very strict national or regional grid requirements. Failure to meet such requirements may result in severe penalties. In the method according to the invention, the step of operating the power network to transfer power from the power generation facilities to the electricity grid is preferably performed to fulfil any such grid requirement, so that a net power at a grid connection point fulfils the grid requirement. Here, a "grid connection point"

is a point at which one or more power production facilities feeds into a grid. The "net power" is the sum of the individual contributions of the various power production facilities. Preferably, whenever appropriate, grid compliance is always given priority over any efficiency or monetary optimization of the power network.

Not all power generation facilities can continually provide power at a constant level. Particularly in the case of "renewable energy" power plants, for example wind turbines or wind power plants, the generated power can exhibit significant variations. During favourable wind conditions, a wind power plant can deliver its rated power, but it may be unable to provide any power at all during calm or stormy conditions. The method according to the invention makes use of the fact that most power generation facilities can generate more power than is required during certain phases, and that the surplus power can be stored in various ways and later retrieved and thus contribute increased competitiveness of the combined production and storage plant by selling the optimal combination of base load power and ancillary services to the grid operator. In a preferred embodiment of the invention, a power storage facility comprises a short-term fast-response power storage facility such as a battery or a fly-wheel, and an operator of the power network will be able to bid on simulated inertial response services. The system can provide inertial response by extracting additional short term energy from such a storage device when energy is available, and by operating with spinning reserve when these short-term facilities have no energy in storage. During a foreseeable brief dip in the grid frequency, one or more such short-term fast-response storage facilities can be "tapped" to correct the deficit, making the plant response more predictable, and minimizing the energy spilled by the plant. A combination of fast/slow response can be used to smoothen out the power production of the power network.

In other situations, it may be foreseeable that a power generation facility will be unable to feed power into the grid for a prolonged duration. For example, a solar energy plant is unable to provide its rated power output during dim or dark conditions. Therefore, to compensate for such a power deficit, in a power network according to the invention a power storage facility preferably comprises a long-term slow-response power storage facility. For example, surplus power can be converted into pumped hydro storage and can be reconverted into electrical energy as required. Equally, such a pumped hydro storage can be used to store surplus energy that can be available for selling in an inter-day or inter-week market, so that excess or surplus energy can be "parked" until it can be sold at an optimum price.

In another situation grid power oscillation damping can be supplied by the virtual plant by oscillating the aggregate power output from the plant as needed for grid stability, but a central power network controller can achieve this oscillating power without curtailing the renewable energy sources. This makes it possible for a power network operator to reduce potential losses and wear, and also makes it possible to sell oscillation damping as a service.

It is also conceivable that the grid operator may need a fast ramping of power in order to retain balance on the grid, for example at the start of a working day. By controlling the production and the storage facilities as a combined power network, the accuracy of such ramping events can become more predictable, so that the method according to the invention may be used to quantify and sell this capability as a service to a grid operator or balancing authority.

Also, the method according to the invention makes it possible to provide under frequency response, i.e. the injection of more active power in proportion to a drop in grid frequency, while at the same time operating any power generation facilities such as wind turbines with a significantly reduced level of spinning reserve. The power increase shall again be extracted primarily from the short-term storage, so that the turbines need only be operated with spinning reserve when the energy level of the storage facilities is very low.

In another situation a grid operator could buy automatic generation control (AGC) services from an owner of a power network according to the invention, with a larger regulation range that could be provided by a conventional power plant that only contains production facilities or only contains storage facilities. The combined power network according to the invention may be operated according to a storage configuration range under consideration of a net import into the plant and an export of available power in addition to whatever power capacity the storage facilities may have.

Preferably, the method according to the invention also prioritizes control functions so that factors such as personal safety, equipment safety, grid compliance, efficiency and monetary optimization of the power network are all considered. It is important to ensure that the amount of current drawn from a facility does not exceed its rated limits, for example the power should not ramp faster than a storage facility can safely discharge. Voltages are preferably kept within safe upper and/or lower bounds.

A key aspect of the method according to the invention is that it allows for an optimization of facility control from a financial aspect—i.e. it allows energy to be produced and stored in a cost-effective manner as well as ancillary services to be provided to the grid, and for this energy or these services to be sold at an optimum price. The price of energy, i.e. the price that is paid to a power plant operator, can vary in the short-term, so that it is important for a network operator to be able to provide a favourable quantity of power at a favourable point in time. The price for ancillary services may similarly vary and new services may become monetized as renewable energy becomes more widespread. However, power production has its price also, and, as mentioned above, power production facilities cannot always deliver the necessary amounts. Therefore, in a particularly preferred embodiment of the invention, the step of determining an optimal facility control plan comprises performing a revenue projection for a combination of energy services and ancillary services on the basis of a number of forecast variables and/or a number of system variables and/or a number of facility constraints.

Preferably, the revenue projection is performed on the basis of one or more of the non-exhaustive set of forecast variables comprising: wind speed forecast; energy production forecast; energy price forecast; spinning reserve price forecast; reactive power price forecast; ramping capability price forecast; inertial response price forecast; frequency response price forecast. The forecast variables that are considered will depend on the types of power production and storage facilities being used. For example, a wind forecast will be relevant for a wind turbine or a wind power plant, while a tide forecast will be relevant for a tidal power plant. A weather forecast can provide information regarding wind direction, pressure, temperature, etc. An energy forecast can be consulted to determine how much energy could be produced during a certain time period in the near future, for example within the next few hours. An advanced energy forecast for a wind power plant may be based on numerical weather models, persistency models, neural network models, wake models, large eddy simulations, a service outage schedule, etc. A service outage schedule can be used to quantify the down-time of a power production or storage facility, during which time that facility is unavailable to the power network. The power production and/or storage can then be distributed over the remaining facilities. An energy price forecast can deliver information about the predicted price of energy in the near future, for example within the next few hours or the next few days, so that a favourable time for selling energy—i.e. feeding energy into the grid—can be determined. The energy price forecast can be based on statistical models that take into account the local market structure, and can use information originating from various external sources. A spinning reserve price forecast can provide useful information about the price that can be obtained for spinning reserve, since this can be monetized as an ancillary service and therefore can be regarded as a "commodity" that can be traded on the energy market. Similarly, a reactive power price forecast can provide useful information about the price of reactive power, which can be sold as an ancillary service in the event of a grid contingency. Other forecasts such as ramping capability price forecast, inertial response price forecast and frequency response price forecast can provide useful information about the potential revenue from such ancillary services.

Some power markets may only monetize energy (kWh) and other markets may have a combination of fixed prices and fluctuating prices for ancillary services. Therefore, in the method according to the invention, the potential financial contribution from each of the ancillary services is preferably adjusted according to the given market structure.

Also, since power production has associated costs, the revenue projection is preferably performed on the basis of one or more of the non-exhaustive set of production cost variables comprising: crane cost; service cost; equipment depreciation; reversible storage cycle cost; non-reversible storage cost; conversion loss; internal transmission loss. "Crane cost" and "service cost" quantify the necessary maintenance costs for the facilities. The "equipment depreciation" system variable quantifies the loss in value of the various elements of the power network. The "reversible storage cycle cost" system variable quantifies the loss in capacity, over time, of a reversible power storage facility. For example, a rechargeable battery can charge and discharge for an estimated number of times, while its storage capacity may decrease over its lifetime. This variable can be used to minimize the cost and maximize the lifetime of the storage unit. A "non-reversible storage cost" system variable can model the type of storage. For example, if the non-reversible storage is a bank of charging stations for charging electric service vehicles, these should preferably be charged during a negative pricing time period, and should also preferably be charged while the service vehicles are not required, for example at night. If the non-reversible storage comprises a compressed gas or synthetic natural gas storage system, the model should provide up-to-date information about the price of natural gas and also the cost of conversion, so that a realistic comparison or trade-off can be made between the value of the power generated by a power production plant and the value of sellable gas. The "conversion loss" system variable quantifies the conversion losses that will be incurred when converting electrical energy into another form and when converting stored energy back into electrical energy. For example, the conversion cost for a thermal system will be a function of the ambient temperature. The "internal transmission loss" system variable quantifies the unavoidable loss of energy when "transferring" power from a power production facility to a power storage facility. Internal transmission losses can be significant for installations comprising very long transmission lines to an interconnection point, for example for large offshore wind power plants. The facility control plan is preferably determined to ensure grid compliance at the point of common connection, and at the same time to optimize the potential revenue not just at a given time but over a given period of time.

A situation may arise in which the electricity price is stable, but the price of another form of energy increases. In other words, the profitability of the other energy form is better. Therefore, the method according to the invention preferably comprises the step of determining quantities of energy originating from different power facilities to be consumed or stored on the basis of corresponding prices for those different energy forms. The method according to the invention therefore makes it possible to determine an optimum trade-off between energy production, energy storage, and energy sale so that the power network can be operated to the best of its capabilities, with favourable profitability and energy efficiency.

With this approach and using the types of variable and constraint mentioned above, the method according to the invention can determine an optimum operation plan scheduling a combination of ancillary services that can be offered, the amount of power to be generated and can determine how much of this generated power should be fed into the grid and how much of it should be converted into another form for immediate consumption or storage for later use during an operation plan scheduling period. The method can also determine an optimum amount of stored power that should be retrieved from a reversible storage and fed into the electricity grid, or an optimum amount of stored power that should be retrieved from a non-reversible storage and fed into a consumer grid. For example, if the price of spinning reserve is predicted to be favourably high within a certain future time window, the optimal combination of charging level for storage batteries, combined with the optimal level of turbine or solar power curtailment should be selected as the operation mode. If spinning reserve is called upon, an appropriate amount shall be made available by retrieving an appropriate amount of energy out of storage and supplementing this by increasing the actual power production of the production facilities. Since the power network controller can optimize the power production as well as the power storage under consideration of many different variables and constraints, the power network may be regarded as a combined control system.

As indicated above, power fed into an electricity grid is sold at a variable power price. However, a situation may also arise in which the power price is negative, i.e. during a phase of over-production, the power plant operator must pay for the power fed into the grid. This might arise when other "non-renewable" power plants are already saturating the grid so that a power demand is already met. A conventional power producing plant may be compelled to terminate production if the accumulated cost of continuing production would otherwise exceed the cost of powering down and powering back up. The method according to the invention therefore preferably comprises the step of identifying a period of negative pricing, for example by consulting a power price forecast and analysing the power production capacity of the power generation facilities, and determining, on the basis of the revenue projection, the amount of stored energy to dispose of in anticipation of negative pricing, and a quantity of power to be stored in a power storage facility during such a period of negative pricing. Therefore, instead of having to pay to "dispose of" excess generated power, this can be converted into another form, for example synthesized natural gas, and stored until it can be sold profitably at a later point in time. A virtual plant or power network according to the invention can therefore stay connected to the grid during a period of negative pricing, and can continue to produce revenue exclusively from the sale of ancillary services.

As indicated above, the power network controller can control each type of power generation facility and power storage facility in a custom or tailored manner so that these are optimally driven. The active power and reactive power grid requirements can fluctuate according to demand. Since certain types of power generation facility can provide active power as well as reactive power, in a particularly preferred embodiment of the invention, the power network controller comprises a reference distributor unit for distributing active power references and reactive power references between the power generation facilities and power storage facilities according to an active component and a reactive component of a grid requirement. For example, if the grid operator requests a specific amount of active power and reactive power, the net active power shall be controlled to reach this level, and the net reactive power level shall likewise be reached by controlling the reactive contribution from each of the storage and production systems to specified set points by the plant controller.

The method according to the invention can be implemented using suitable software algorithms running on appropriate types of computer or server. For example, a computer program product can comprise software algorithms for carrying out the steps of monitoring a production capacity of the power generation facilities; monitoring a storage capacity of the power storage facilities; performing a revenue projection and for generating references; determining an optimal facility control plan, etc., when the computer program product is loaded into a memory of a programmable device of the power network controller according to the invention.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

In the diagrams, like numbers refer to like objects throughout. Objects in the diagrams are not necessarily drawn to scale.

Figure 1:
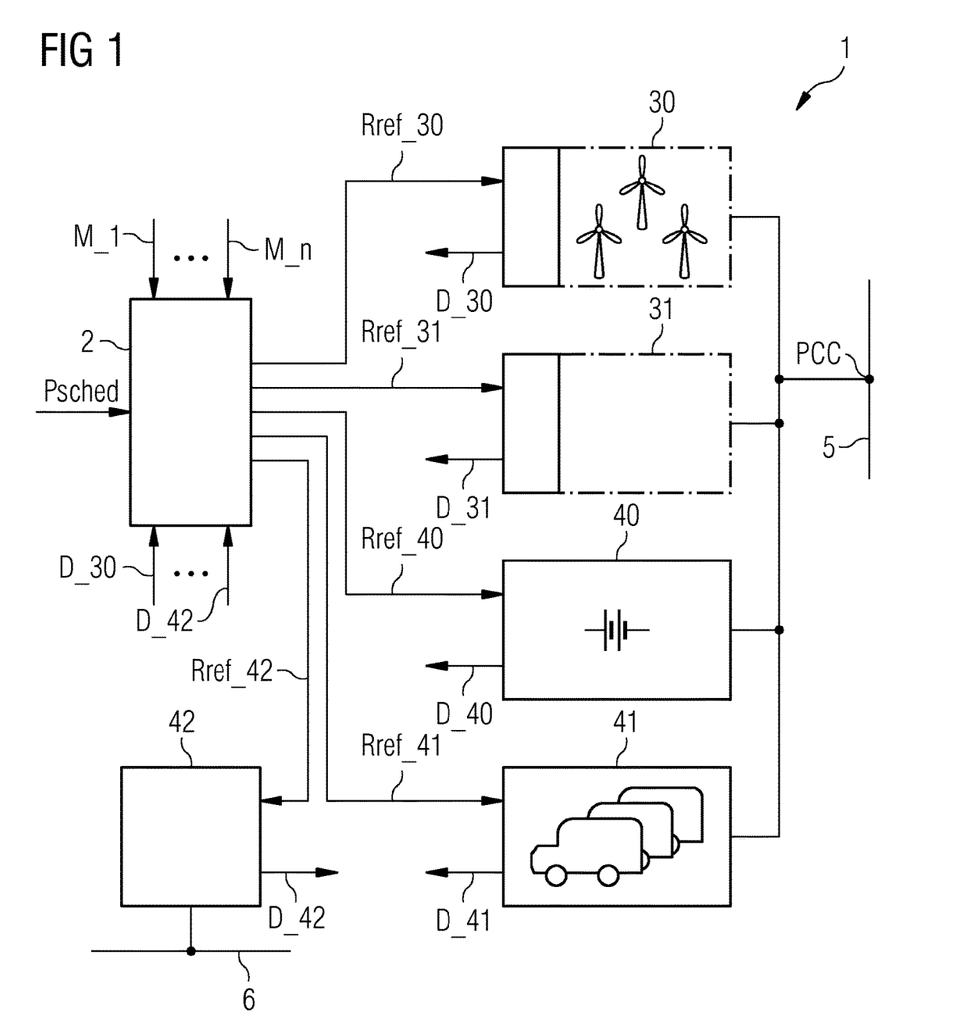
FIG. 1 shows a block diagram of a power network according to an embodiment of the invention.

FIG. 1 shows a block diagram of a power network 1 according to an embodiment of the invention. The power network comprises various power generation plants 30, 31 and various power storage facilities 40, 41, 42. Power that is output by the power generation plants 30, 31 and a reversible power storage facility 40 is collected at a point of common connection PCC for feeding into an electricity grid 5. Surplus power generated by the power generation plants 30, 31 can be transferred to non-reversible power storage facilities 41, 42 such as the batteries 41 of a fleet of electric vehicles, or a synthetic natural gas plant 42, which in this embodiment is realised to supply gas to a consumer gas grid 6.

A power network controller 2 receives an input power reference Psched indicating the amount of electrical power required by the grid 5. The power network 1 must fulfil this requirement.

To this end, the power network controller 2 decides how much active power and reactive power should be transferred between the power generation plants 30, 31, the power storage facilities 40, 41, 42, and the grid 5. The power network controller 2 establishes an optimal facility control plan on the basis of the production capacity of the power plants 30, 31 and on the storage capacity of the storage plants 40, 41, 42, and operates the facilities according to the facility control plan to transfer active power and re-active power between the power plants 30, 31 and the grid 5 and/or between the power plants 30, 31 and the storage plants 40, 41, 42, and/or from a reversible storage plant 40 to the grid 5. The power network controller 2 determines the optimal facility control plan by considering a number of input parameters $M\_1, \ldots, M\_n$ and data $D\_30, D\_31, D\_40, D\_41, D\_42$ from the power production and storage plants 30, 31, 40, 41, 42. For example, data $D\_30$ from a wind power plant 30 can supply production data of that wind power plant 30 such as active power, available power, max loss power (used to calculated controller limits), max reference (the max amount of power a sub plant can produce, e.g. its rated power or a value determined by a limitation on a transformer or power line), active power frequency, rated park power, etc; while data $D\_41$ from a non-reversible power storage facility 41 may include information about its momentary capacity. The input parameters $M\_1, \ldots, M\_n$ can provide information about many different aspects of the operation of the power network, for example system variables, forecasts, and constraints. On the basis of this information, the facility control plan can be used to generate references $Rref\_30, Rref\_31, Rref\_40, Rref\_41, Rref\_42$ for each of the facilities. For example, a reference $Rref\_30$ for the wind power plant 30 can define active and/or reactive power references for that wind power plant, and a park pilot of the wind power plant 30 can generate appropriate references for each of the wind turbines. A reference could also be controlled as a voltage reference or a power factor reference or a combination of voltage, reactive power or power factor references.

The diagram only shows five facilities 30, 31, 40, 41, 42 but of course any number of facilities can be combined in a virtual plant. Furthermore, the facilities of such a combined virtual plant do not have to be geographically close together, but can be located at any distance from each other. The facilities of a combined virtual plant do not even need to feed into the same grid, since the power network controller can take more than one electrical grid into consideration.

Figure 2:
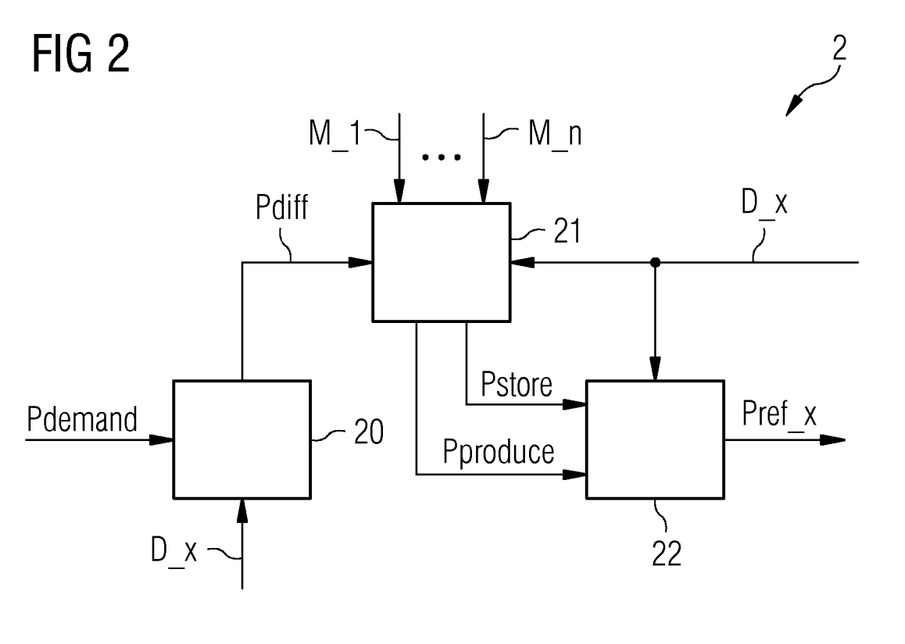
FIG. 2 shows a block diagram of a power network controller according to an embodiment of the invention.

FIG. 2 shows a block diagram of a power network controller 2 or "governor" 2 according to an embodiment of the invention. In this realisation, a control block 20 receives a grid requirement or reference Pdemand that indicates a required grid power that must be delivered, i.e. the entire power network must operate to satisfy this reference Pdemand. The grid reference Pdemand can be the same as the input power reference Psched indicated in FIG. 1, or can be derived from that by a suitable reference selector unit (not shown). The control block 20 compares this with information about the momentary power production given in the data D_x delivered by power generation facilities of the power network, and identifies a difference—surplus or deficit—and provides an appropriate signal to an optimizing module 21. The optimizing module 21 receives various input parameters M_1, . . . , M_n, as well as production data D_x from all power generation and storage facilities. On the basis of this information, the optimizing module 21 can determine the amount of power that should be generated and sold into the grid, the amount of power that should be stored for later use, and the amount of power that should be retrieved from a reversible power storage facility. Many parameters such as power price, weather forecast, power price forecast, service cost etc. as described above, are taken into consideration to determine an optimal plan for this power network from the point of view of short-term and long-term profitability as well as energy efficiency. The optimizing module 21 issues appropriate signals Pstore, Pproduce to a reference distribution unit 22. The optimizing module 21 can generate one collective power storage signal Pstore, or individual power storage signals for each of the storage facilities. Similarly, the optimizing module 21 can generate one collective power production signal Pproduce, or individual power production signals for each of the power production facilities. The reference distribution unit 22 uses this information as well as the production data D_x from all power generation and storage facilities to calculate appropriate references Pref_x for each of the facilities.

Figure 3:
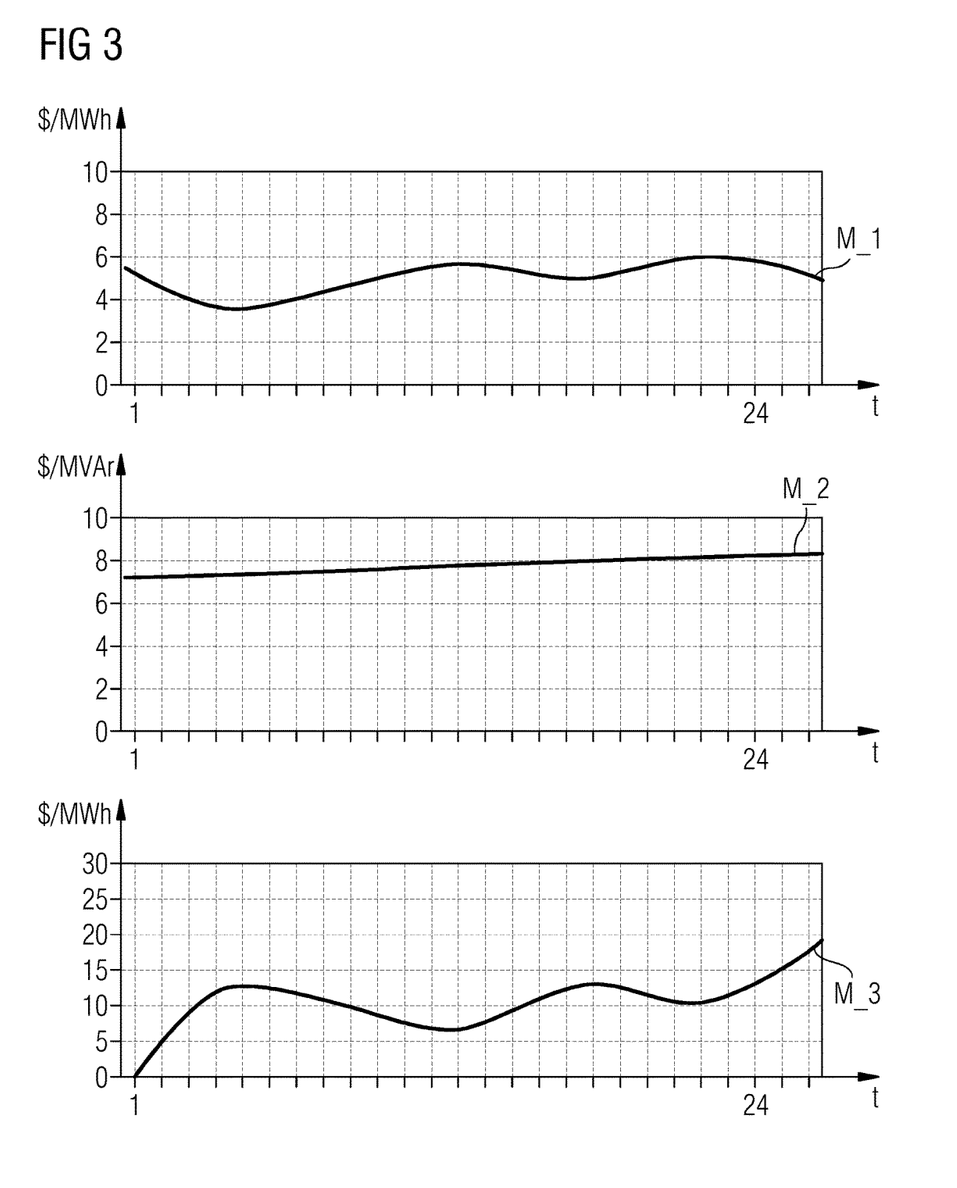
FIG. 3 shows a number of parameters considered by the power network controller of FIG. 2.

FIG. 3 shows various parameters considered by the optimizing module 21 of the power network controller 2 of FIG. 2. The diagram shows exemplary plots of spinning reserve forecast M_1 (quantified in $/MWh), reactive power support M_2 (quantified in $/MVAr), and energy price M_3 (quantified in $/MWh). The diagram indicates how such parameters or variables can fluctuate over time (X-axis, hours). Clearly, the point in time at which energy is sold into the electricity grid, or the point in time at which an ancillary service such as spinning reserve or reactive power is sold can significantly influence the profitability of the power network.

Figure 4:
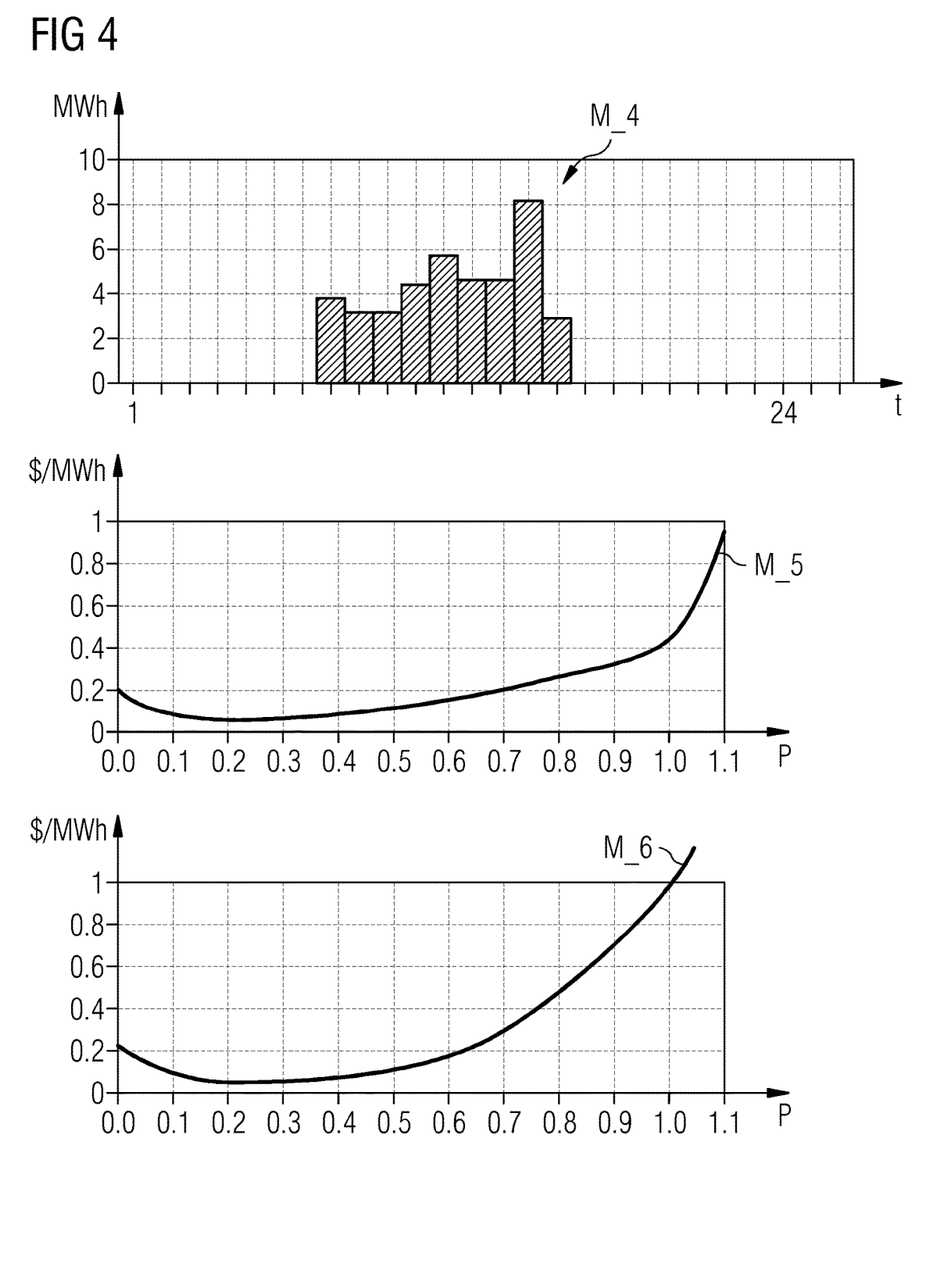
FIG. 4 shows further parameters considered by the power network controller of FIG. 2.

FIG. 4 shows further parameters that might be considered by the optimizing module 21 of the power network controller 2 of FIG. 2. The diagram shows exemplary plots of service schedule M_4 (quantified in MWh), service cost M_5 and equipment depreciation index M_6 (both quantified in $/MWh), which can be of relevance for a facility whose lifetime can be extended by operating it at lower load levels. These graphs indicate how such parameters or variables can develop over time t (in the case of service schedule M_4) or how they are related to production levels p (in the case of service cost M_5 and equipment depreciation index M_6), so that consideration of these factors can be beneficial when working out an optimal facility plan for a power network.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of controlling a power network comprising a plurality of power generation facilities connected to an electricity grid and a plurality of power storage facilities connected to the power generation facilities, the method comprising:
   monitoring a production capacity of the power generation facilities;
   monitoring a storage capacity of the power storage facilities;
   determining a grid requirement to be fulfilled, wherein the grid requirement can be required grid power to deliver;
   determining an optimal facility control plan based on the storage capacity and the production capacity; wherein determining the optimal facility control plan further comprises performing a revenue projection for a combination of energy and ancillary services based on a plurality of forecast variables comprising: wind forecast energy forecast energy price forecast spinning reserve price forecast; reactive power price forecast; ramping capability forecast; inertial response forecast frequency response forecast;
   distributing active power references and reactive power references between the power generation facilities and power storage facilities according to an active component and a reactive component of a grid requirement; and
   operating the power network, according to the facility control plan, to feed power from the power generation facilities into the electricity grid and/or to transfer power from the power generation facilities to the power storage facilities and/or to feed power from the power storage facilities into the electricity grid, wherein said operating of the power network is performed to fulfill the grid requirement.

2. The method according to claim 1, further comprising a step of monitoring an ancillary service capability of a production facility and an ancillary service capability of a storage facility.

3. The method according to claim 1, wherein
   the revenue projection for a combination of energy and ancillary services is performed based on one or more of the set of system variables comprising: service schedule; service cost; equipment depreciation; reversible storage cycle cost; conversion loss; internal transmission loss; and/or on the basis of one or more of the set of constraints comprising: min/max power allowed; min/max energy allowed; maximum ramp; change rate.

4. The method according to claim 1, further comprising:
   determining, on the basis of the revenue projection, a quantity of active power to be delivered to the electricity grid.

5. The method according to claim 1, further comprising:
   determining, on the basis of the revenue projection, a quantity of active power and reactive power generated by the power generation facilities to be stored in a power storage facility.

6. The method according to claim 1, further comprising:
   identifying a period of negative pricing and determining, on the basis of the revenue projection, a quantity of power to be stored in a power storage facility during the period of negative pricing.

7. The method according to claim 1, further comprising:
   determining quantities of energy originating from different power facilities to be consumed or stored, on the basis of corresponding prices for those different energy forms.

8. The method of claim 1, having a power network comprising:
- a plurality of power generation facilities connected to an electricity grid and a plurality of power storage facilities connected to the power generation facilities; and
- a power network controller for controlling the power network.

9. The previously presented claim 8, wherein a power generation facility is selected from the group consisting of: a wind power plant; a tidal power plant; a solar power plant.

10. The method of claim 8, wherein a power storage facility is selected from the group consisting of: a thermal storage facility; a battery storage facility; a fly-wheel storage facility; a compressed air storage facility; a hydro-electric facility; a synthetic natural gas storage facility.

11. The method of claim 8, wherein a power storage facility comprises a short-term fast-response storage facility and/or a long-term slow-response storage facility.

12. A power network controller for controlling a power network, the power network comprising a plurality of power generation facilities connected to an electricity grid and a plurality of power storage facilities comprising:
- an optimizing module for determining an optimal facility control plan based on a storage capacity of the power storage facilities and a generation capacity of the power generation facilities and the requirements of the grid that need to be fulfilled, wherein the grid requirement can be required grid power to deliver; wherein the optimal facility control plan is further based on performing a revenue projection for a combination of energy and ancillary services based on a plurality of forecast variables comprising: wind forecast; energy forecast; energy price forecast; spinning reserve price forecast reactive power price forecast ramping capability forecast inertial response forecast; frequency response forecast;
- a reference computation unit for computing references for operating the power generation facilities and the power storage facilities on the basis of the facility control plan; and
- a reference distributor unit for distributing active power references and reactive power references between the power generation facilities and power storage facilities according to an active component and a reactive component of a grid requirement and to fulfill a grid requirement.

13. A method of controlling a power network comprising a plurality of power generation facilities connected to an electricity grid and a plurality of power storage facilities connected to the power generation facilities, wherein the power storage facilities comprises at least one reversible power storage facility, wherein power output by the power generation facilities and the at least one reversible power storage facility is collected at a point of common connection the method comprising:
- monitoring a production capacity of the power generation facilities;
- monitoring a storage capacity of the power storage facilities;
- determining a grid requirement to be fulfilled, wherein the grid requirement can be required grid power to deliver;
- determining an optimal facility control plan based on the storage capacity of the power storage facilities and the production capacity of the power generation facilities; wherein determining the optimal facility control plan further comprises performing a revenue projection for a combination of energy and ancillary services based on a plurality of forecast variables comprising: wind forecast; energy forecast; energy price forecast; spinning reserve price forecast; reactive power price forecast ramping capability forecast inertial response forecast frequency response forecast;
- distributing active power references and reactive power references between the power generation facilities and power storage facilities according to an active component and a reactive component of a grid requirement; and
- operating the power network, according to the optimal facility control plan, to feed power from the power generation facilities into the electricity grid and/or to transfer power from the power generation facilities to the power storage facilities and/or to consume power from the power storage facilities.

* * * * *